(12) United States Patent
Shoseyov et al.

(10) Patent No.: US 9,376,503 B2
(45) Date of Patent: Jun. 28, 2016

(54) CELLULOSE-BASED COMPOSITE MATERIALS

(75) Inventors: Oded Shoseyov, Carmei Yosef (IL); Arnon Heyman, Gedera (IL); Shaul Lapidot, Kibbutz Tzora (IL); Sigal Meirovitch, Tel Aviv (IL); Yuval Nevo, Rehovot (IL); Tord Gustafsson, Lulea (SE)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 389 days.

(21) Appl. No.: 13/821,192

(22) PCT Filed: Sep. 7, 2011

(86) PCT No.: PCT/IL2011/000714
§ 371 (c)(1),
(2), (4) Date: Mar. 6, 2013

(87) PCT Pub. No.: WO2012/032514
PCT Pub. Date: Mar. 15, 2012

(65) Prior Publication Data
US 2013/0171439 A1     Jul. 4, 2013

Related U.S. Application Data

(60) Provisional application No. 61/380,538, filed on Sep. 7, 2010.

(51) Int. Cl.
| | | |
|---|---|---|
| B32B 7/02 | (2006.01) |
| C08B 15/00 | (2006.01) |
| B82Y 30/00 | (2011.01) |
| C08J 9/00 | (2006.01) |
| C08J 9/28 | (2006.01) |
| C08J 9/36 | (2006.01) |
| C08J 9/42 | (2006.01) |
| C08L 1/00 | (2006.01) |

(52) U.S. Cl.
CPC ............. *C08B 15/00* (2013.01); *B82Y 30/00* (2013.01); *C08J 9/0061* (2013.01); *C08J 9/28* (2013.01); *C08J 9/365* (2013.01); *C08J 9/42* (2013.01); *C08L 1/00* (2013.01); *C08J 2201/026* (2013.01); *C08J 2201/048* (2013.01); *C08J 2201/0482* (2013.01); *C08J 2205/026* (2013.01); *C08J 2205/042* (2013.01); *C08J 2205/05* (2013.01); *C08J 2301/00* (2013.01); *C08J 2461/00* (2013.01)

(58) Field of Classification Search
CPC .............. B82Y 30/00; C08L 1/00; C08J 9/28; C08J 9/365
USPC .................................................. 428/212, 220
See application file for complete search history.

(56) References Cited

U.S. PATENT DOCUMENTS

| | | | |
|---|---|---|---|
| 7,455,901 B2 | 11/2008 | Yano et al. | |
| 2007/0059233 A1* | 3/2007 | Sheem et al. | 423/445 R |
| 2008/0108772 A1 | 5/2008 | Oksman et al. | |
| 2008/0242765 A1 | 10/2008 | Weder et al. | |

FOREIGN PATENT DOCUMENTS

| | | |
|---|---|---|
| EP | 0 212 289 A1 | 3/1987 |
| JP | 62-27944 A | 2/1987 |
| JP | 2005-60680 A | 3/2005 |
| JP | 2006-240295 A | 9/2006 |
| JP | 2008-127510 A | 6/2008 |
| JP | 2009-107156 A | 5/2009 |
| WO | 2010/095574 A1 | 8/2010 |

OTHER PUBLICATIONS

Blaker, et al., "Renewable nanocomposite polymer foams synthesized from Pickering emulsion templates", Green Chem., vol. 11, pp. 1321-1326, (2009).
Bondeson, et al., "Optimization of the isolation of nanocrystals from microcrystalline cellulose by acid hydrolysis", Cellulose, vol. 13, pp. 171-180, (2006).
Capadona, et al., "Stimuli-Responsive Polymer Nanocomposites Inspired by the Sea Cucumber Dermis", Science, vol. 319, pp. 1370-1374, (2008).
Paakko, et al., "Flexible and hierarchically porous nanocellulose aerogels: Templates for functionalities", Abstracts of Papers. ACS National Meeting, vol. 239th, pp. CELL-227, XP009138776, (2010).
Petersson, et al., "Structure and thermal properties of poly(lactic acid)/cellulose whiskers nanocomposite materials", Composites Science and Technology, vol. 67, No. 11-12, pp. 2535-2544, XP022082444, (2007).
The International Search Report for International Application No. PCT/IL2011/000714, three pages, mailed Jan. 18, 2012.
Eichhorn, et al., "Review: current international research into cellulose nanofibres and nanocornposites", J Mater Sci, vol. 45, pp. 1-33, (2010).
Li, et al., "Rigid polyurethane foam reinforced with cellulose whiskers: Synthesis and characterization", Nano-Micro Letters, vol. 2, No. 2, pp. 89-94, (2010).

(Continued)

*Primary Examiner* — Aaron Austin
*Assistant Examiner* — Lawrence Ferguson
(74) *Attorney, Agent, or Firm* — Vorys, Sater, Seymour and Pease LLP

(57) ABSTRACT

Provided are cellulose nano-material based composite and foam articles.

21 Claims, 6 Drawing Sheets

(56) References Cited

OTHER PUBLICATIONS

Lima, et al., "Rodlike Cellulose Microcrystals: Structure, Properties, and Applications", Macromol. Rapid Commun., vol. 25, pp. 771-787, (2004).

Paakko, et al., "Long and entangled native cellulose I nanofibers allow flexible aerogels and hierarchically porous templates for functionalities", Soft Matter, vol. 4, pp. 2492-2499, (2008).

Pranger, et al., "Biobased Nanocomposites Prepared by In Situ Polymerization of Furfuryl Alcohol with Cellulose Whiskers or Montmorillonite Clay", Macromolecules, vol. 41, No. 22, pp. 8682-8687, (2008).

Ross, et al., "Cellulose Biosynthesis and Function in Bacteria", Microbiological Reviews, vol. 55, No. 1, pp. 35-58, (1991).

Samir, et al., "Review of Recent Research into Cellulosic Whiskers, Their Properties and Their Application in Nanocomposite Field", Biomacromolecules, vol. 6, pp. 612-626, (2005).

Svagan, et al., "Biomimetic Foams of High Mechanical Performance Based on Nanostructured Cell Walls Reinforced by Native Cellulose Nanofibrils", Adv. Mater., vol. 20, pp. 1263-1269, (2008).

* cited by examiner

CELLULOSE-BASED COMPOSITE MATERIALS

FIELD OF THE INVENTION

The present invention is generally directed to cellulose foams and high strength composite materials comprising cellulose and a polymeric material. The invention is also directed to applications thereof as core and/or structural materials.

BACKGROUND OF THE INVENTION

Cellulose is a polysaccharide having a linear chain of several hundred to over ten thousand β(1→4) linked D-glucose units. Cellulose is the structural component of the primary cell wall of green plants, many forms of algae and the oomycetes. Cellulose is also the major component of wood, and thus of paper, and is the most common organic compound on Earth. About 33 percent of all plant matter is cellulose (the cellulose content of cotton is 90 percent and that of wood is 40-50 percent).

Cellulose Whiskers (CW) also known as nanocrystalline cellulose (NCC) are fibers produced from cellulose; the NCC are typically high-purity single crystals. They constitute a generic class of materials having mechanical strengths equivalent to the binding forces of adjacent atoms. The resultant highly ordered structure produces not only unusually high strengths but also significant changes in electrical, optical, magnetic, ferromagnetic, dielectric, conductive, and even superconductive properties. The tensile strength properties of NCC are far above those of the current high volume content reinforcements and allow the processing of the highest attainable composite strengths. A review of the literature on NCC, their properties, and their possible use as a reinforcing phase in nano-composite applications is given by [1-3].

Another type of nano-cellulosic material is nano-fibers, known as Micro Fibrilited Cellulose (MFC) or Nano fibrillated cellulose (NFC) which are produced, e.g., by enzymatic treatment of mainly bleached pulp followed by shearing and homogenization of mainly bleached pulp. In some cases enzymatic pretreatments are applied in order to reduce the required production energy. Due to the relatively mild conditions employed, the amorphous cellulose remains intact, resulting in micrometer long fibers with a nano-metric diameter [4].

Bacterial Cellulose (BC) is a nanostructured extracellular product obtained from certain cellulose producing bacteria such as *Gluconobacter Xilinus* [5]. The cellulose fibrils, being generally of higher crystallinity and purity than those obtained from plant sources (as no lignin or hemicelluloses are present), are inherently of nano-sized dimensions in their cross-section.

Polymeric foams are materials with high importance in the field of composite materials. Foams are used for many applications, e.g. for insulation, structural parts such as car dash boards, as well as for core materials in manufacturing of composite sandwich panels to achieve high strength, energy dissipation, insulation, and weight reduction. Conventional foams are produced from oil based polymers such as foamed polyvinyl chloride (PVC), polyethylene (PE), polyurethane (PU), polystyrene (PS), polymethacrylimide (PMI) and polypropylene (PP). Polymeric foams convey high insulation and weight reduction properties; however, some have low strength and as all are fossil oil-based, they impress a clear environmental disadvantage.

Recently, it was shown that NCC as well as nano-fibers can be processed into foams by simple methods. The preferred method for production of such foams is by casting NCC or nano-fibers suspension into molds followed by freeze-drying. The foams maybe produced also by any other foaming technique such as supercritical fluid extraction, micro-fluidics, etc. The resulting foams also termed aerogels are highly porous and light weight. Nevertheless, these foams display low resistance for compression and therefore their utilization as core materials is limited [3].

NCCs have been shown to significantly improve the mechanical properties of polymeric composite materials. However, to achieve homogeneous suspension of the NCC in a polymer resin, high energy and often expensive equipment is necessary [6]. Pranger and Tannenbaum [7] have demonstrated that furan resin can be dispensed by dry sulfur treated cellulose nano-fibriles and serve as catalyst for furan polymerization.

REFERENCES

[1] De Souza Lima, M. and R. Borsali, *Rodlike cellulose microcrystals: Structure, properties, and applications*. Macromolecular Rapid Communications, 2004. 25(7).

[2] Samir, M., F. Alloin, and A. Dufresne, *Review of recent research into cellulosic whiskers, their properties and their application in nanocomposite field*. Biomacromolecules, 2005. 6(2): p. 612-626.

[3] Eichhorn, S., et al., *Review: current international research into cellulose nanofibres and nanocomposites*. Journal of Materials Science. 45(1): p. 1-33.

[4] Pääkkö, M., et al., *Long and entangled native cellulose I nanofibers allow flexible aerogels and hierarchically porous templates for functionalities*. Soft Matter, 2008. 4(12): p. 2492-2499.

[5] Ross, P., et Al., *Cellulose biosynthesis and function in bacteria*. Microbiol. Rev., 1991. 55(1): 35-58.

[6] Oksman, K., D. Bondeson, and P. Syre, *Nanocomposites Based On Cellulose Whiskers And Cellulose Plastics*. 2006, US Patent Application No. 2008/0108772

[7] Pranger, L. and R. Tannenbaum, *Biobased Nanocomposites Prepared by In Situ Polymerization of Furfuryl Alcohol with Cellulose Whiskers or Montmorillonite Clay*. Macromolecules, 2008. 41(22): p. 8682-8687.

[8] Bondeson D, Mathew A, Oksman K: *Optimization of the isolation of nanocrystals from microcrystalline cellulose by acid hydrolysis*. Cellulose 2006, 13(2):171-180.

[9] Svagan A J, Samir M A S, Berglund L A: *Biomimetic foams of high mechanical performance based on nanostructured cell walls reinforced by native cellulose nanofibrils*. Advanced Materials 2008, 20(7):1263-1269.

[10] Blaker J J, Lee K Y, Li X, Menner A, Bismarck A: *Renewable nanocomposite polymer foams synthesized from Pickering emulsion templates*. Green Chemistry 2009, 11(9):1321-1326.

[11] Li Y, Ren H, Ragauskas A J: *Rigid polyurethane foam reinforced with cellulose whiskers: Synthesis and characterization*. Nano-Micro Letters 2010, 2(2):89-94.

[12] Capadona J, Shanmuganathan K, Tyler D, Rowan S, Weder C: *Stimuli-responsive polymer nanocomposites inspired by the sea cucumber dermis*. Science 2008, 319 (5868):1370.

SUMMARY OF THE INVENTION

The inventors of the present invention have developed a process for the preparation of foam materials of cellulose nano-materials. The foam materials provide the opportunity to manufacture high strength and high quality composite materials and articles with thermosetic/thermoplastic polymers.

As disclosed herein, the foam materials of the invention and the corresponding composites are based on cellulose nano-materials, such as cellulose whiskers (CW)—also known as nanocrystalline cellulose (NCC), microfibrillated cellulose (MFC), and bacterial cellulose (BC). The processes of the invention require very low energy investment and produce biobased nano-cellulose foams and composites that exhibit applications both as core materials as well as insulation materials and structural industrial materials, for example, in the composite and the packaging industries.

Thus, in one aspect of the present invention there is provided a composite article constructed of a cellulose nano-material scaffold and at least one polymer resin (of a thermoset or thermoplastic polymer), the cellulose nano-material scaffold being of a material selected from cellulose whiskers (CW, also known as nanocrystalline cellulose, NCC), microfibrillar cellulose (MFC) and bacterial cellulose (BC), wherein the at least one polymer resin at least partially occupying a plurality of pores in the scaffold.

As known in the art, NCC are elongated crystalline rod-like nanoparticles and the MFC are elongated strings consisting of alternating crystalline and amorphous segments. As used herein, MFC also encompasses nanofibrillated cellulose (NFC). Bacterial cellulose (BC) is a nanostructured extracellular product obtained from certain cellulose producing bacteria such as *Gluconobacter Xilinus*. The cellulose fibrils, being generally of higher crystallinity and purity than those obtained from plant sources, are inherently of nano-sized dimensions.

In some embodiments, the cellulose nano-material is characterized by having at least 50% crystallinity. In further embodiments, the cellulose nano-material is monocrystalline.

In some embodiments, the cellulose nano-material, produced as particles (e.g., fibrils, or in other cases as crystalline material) from cellulose of various origins, as further detailed hereinbelow, is selected to be at least about 100 nm in length. In other embodiments, they are at most about 1,000 μm in length. In other embodiments, the nanoparticles are between about 100 nm and 1,000 μm in length, between about 100 nm and 900 μm in length, between about 100 nm and 600 μm in length, or between about 100 nm and 500 μm in length.

In some embodiments, the nanoparticles are between about 100 nm and 1,000 nm in length, between about 100 nm and 900 nm in length, between about 100 nm and 800 nm in length, between about 100 nm and 600 nm in length, between about 100 nm and 500 nm in length, between about 100 nm and 400 nm in length, between about 100 nm and 300 nm in length, or between about 100 nm and 200 nm in length.

The thickness of the cellulose nano-material may vary between about 5 nm and 50 nm.

The fibrils of the cellulose nano-material may be selected to have an aspect ratio (length-to-diameter ratio) of 10 and more. In some embodiments, the aspect ratio is 67-100.

In some embodiments, where the cellulose nano-material is NCC, it selected to be between about 100 nm and 400 nm in length and between about 5 nm and 30 nm in thickness.

In some embodiments, the composite of the invention comprises at least two types of cellulose nano-material.

As used herein, the "polymer resin" refers to a resin of at least one thermoset polymer and/or at least one thermoplastic polymer, that undergoes curing by heating, a chemical reaction, and/or irradiation. The resin may be synthetic, semi-synthetic or a chemically modified natural molecule. The resin may also be obtained from various natural sources, such as natural oils.

In some embodiments, the polymer resin is at least one thermoset polymer resin, being synthetic, semi-synthetic or based obtained from a natural source (either as a modified or non-modified resin material). Non-limiting examples of such thermoset resins include: thermoset silicone polymers such as cured silicone elastomers, silicone gels, and silicone resins; and thermoset organic polymers such as furan resins, epoxy resin amino resins, polyurethanes (polyols and isothiocyanates), polyimides, phenolic resins, cyanate ester resins, bismaleimide resins, polyesters, acrylic resins, and others.

In some embodiments, the at least one polymer is biobased. Non-limiting examples of such biobased resins include: UV curable epoxidised soybean oil acrylate (UCB, Ebecryl 860), linseed triglycerides and polycarboxylic acid anhydrides (Biocomposites and more, PTP), triglyceride acrylate (Cogins, Tribest S531), epoxidised pine oil waste (Amroy, EPO-BIOX™), DSM Palapreg® ECO P55-01, Ashland Envirez® Unsaturated Polyester Resins from renewable and recycled Resources, Soy oil unsaturated polyester (Reichhold, POLYLITE 31325-00), Liquid epoxy resins based on glycerin (Huntsman) and others.

In some embodiments, the at least one thermoset resin is a furan resin. In some embodiments the furan resin is selected from liquid furfuryl alcohol resin, furfuryl alcohol-formaldehyde resin, furfuryl alcohol-furfural-formaldehyde resin, furfuryl alcohol phenol resin, furfuryl alcohol-urea-formaldehyde resin, furfuryl alcohol-urea-phenol resin and furfural phenol resin.

In some embodiments, the furan resin is furfuryl alcohol resin.

In some embodiments, the furan resin is a biobased thermoset furan resin produced from sugar cane baggase (e.g. BioRez™; a two component resin produced by Transfuran Chemicals bvba, Geel, Belgium).

In accordance with the present invention, the furan may be used in a concentration of about 85% (in water). In some embodiments, the furan resin is diluted in water, or in a water-soluble solvent such as ethanol, to a concentration of 10-65%. In other embodiments, a catalyst is added to the furan resin for catalyzing the reaction.

In other embodiments, the polymer resin is at least one thermoplastic resin. Non-limiting examples of such thermoplastic resins include: polyolefins, polar thermoplastics, polystyrene, polyvinyl chloride (PVC), acrylonitrile-butadiene-styrene (ABS), styrene copolymers, polyacrylonitrile, polyacrylates, polyacrylamides, vinyl acetate polymers, vinyl alcohol polymers, cellulose plastics, thermoplastic elastomers, thermoplastic polyurethanes, polyester-based thermoplastic elastomers, thermoplastic polyesters, polyethylene terephthalate, polybutylene terephthalate, compatibilized thermoplastic blends, polyacetal, polyethers, polyarylates, polycarbonates, polyamides, polyimides, polybenzimidazoles, aromatic polyhydrazides and polyoxadiazoles, polyphenyl-quinoxalines, polyphenylene sulfide, polyphenylene vinylene, conducting thermoplastics, conducting thermoplastics composites, poly(aryl ether sulfone)s, poly(aryl ether ketone)s, poly(aryl ether ketones-co-sulfones), poly(aryl ether ketone amide)s, polytetrafluoroethylene and mixtures thereof.

In other embodiments, the at least one resin is selected from a standard polyester, an epoxy, and natural rubber.

In some embodiments, the cellulose nano-material is NCC and the at least one polymer resin is furfuryl alcohol resin.

The composite article of the invention comprises a cellulose nano-material, such as NCC, and at least one polymer (originating from the corresponding resin, e.g., a furan resin), at a cellulose:polymer weight ratio between about 1:100 to 100:1. In some embodiments, the weight ratio is 1:90, or 1:80, or 1:70, or 1:60, or 1:50, or 1:40, or 1:30, or 1:20, or 1:10 cellulose-nano-material to polymer. In further embodiments, the ratio is 1:11, 1:12, 1:13, 1:14, 1:15, 1:16, 1:17, 1:18, 1:19, 1:20, 1:21, 1:22, 1:23, 1:24, 1:25, 1:26, 1:27, 1:28, 1:29, 1:30, 1:31, 1:32, 1:33, 1:34, 1:35, 1:36, 1:37, 1:38, 1:39, 1:40, 1:41, 1:42, 1:43, 1:44, 1:45, 1:46, 1:47, 1:48, 1:49, 1:50, 1:51, 1:52, 1:53, 1:54, 1:55, 1:56, 1:57, 1:58, 1:59, 1:60, 1:61, 1:62, 1:63, 1:64, 1:65, 1:66, 1:67, 1:68, 1:69, 1:70, 1:71, 1:72, 1:73, 1:74, 1:75, 1:76, 1:77, 1:78, 1:79, 1:80, 1:81, 1:82, 1:83, 1:84, 1:85, 1:86, 1:87, 1:88, 1:89, 1:90, 1:91, 1:92, 1:93, 1:94, 1:95, 1:96, 1:97, 1:98, 1:99, or 1:100. It should be understood that, for example, "a ratio of 1:67" cellulose-nano-material to resin is equivalent to a ratio of 2:134, 4:268, 30:2010, etc.

As stated above, the composite article of the invention is constructed of a scaffold of a cellulose nano-material and at least one polymer, wherein the polymer forms a material continuity within said scaffold, i.e., in a plurality pores in the scaffold. In some embodiments, the composite material has homogenous porosity. In order to endow a composite article of the invention with increased mechanical stability, depending on the final intended application, the article may be laminated with a film of a natural or synthetic material. The lamination may be by one or more lamination films positioned on one or more sides of the article. For example, where the article is substantially flat, it may be laminated on both its faces with one or more lamination materials. Where the article is constructed as a three dimensional cube, it may be laminated on all of its six faces. The lamination film may be of a material selected from natural fabrics, including flax, sisal, wood-fibers hemp, and cotton. Other lamination materials may be selected from mineral wool fiber, glass wool, glass fibers, synthetic fibers such as aramid, paper materials, plastic materials and carbon fibers.

Without being bound thereto, the laminated articles, i.e., laminates produced in accordance with the invention, are suitable for use in interior trims (e.g. in cars, boats, planes etc), as fire resistant material and/or flame retarding article, as insulators for insulation purposes (e.g. when rockwool fiber is used), as shock absorbing materials and others.

In some exemplary embodiments, the invention provides a NCC-based composite laminated with flat paper sheets. Generally, such a laminate, as is the case with any other laminate of the invention, may be constructed by bonding at least two flat sheets of the same or different lamination material, onto an outer surface (face) of an article. The lamination may be carried out in the presence of pressure and/or heat. In some embodiments, the layers or sheets are composed of a homogeneous mixture of two or more materials. In other embodiments, the materials are inhomogeneously distributed in each of the at least two layers or sheets. Thus, for example, an article of the invention may be laminated on one of its faces with a paper material and on another of its faces with a natural fabric such as flax.

The articles of the invention may be manipulated to a desired shape and size.

In another one of its aspects the present invention provides a process of producing a composite article according to the invention, the process comprising:
(a) obtaining a cellulose nano-material scaffold (foam, aerogel), e.g., composed of NCC and/or MFC and/or BC;
(b) infusing a liquid resin of at least one polymer to the scaffold to obtain continuity of the resin in the scaffold;
(c) curing the product of step (b) to obtain partial or complete curing of the resin.

In some embodiments, the process further comprises the step of crosslinking the cellulose nano-material forming the scaffold prior to infusion of the resin.

In some embodiments, the scaffold comprises a mixture of NCC and MFC or BC.

The curing of the resin within the scaffold may proceed at various temperatures between 1° C. and between about 80° C. In some embodiments, curing is achievable at room temperature, without needing external heating. In other embodiments, however, the curing is achievable by heating the scaffold infused with the resin to a temperature above room temperature, e.g., to a temperature between about 50° C. and about 200° C. In other embodiments, the curing temperature is between about 70° C. and about 150° C.

In some embodiments, the resin material is infused together with at least one accelerator or a catalyst to enable efficient curing, fast curing and/or curing at a low temperature.

In other embodiments, the resin contains cellulose nano-material, e.g., NCC and/or MFC and/or BC. In other embodiments, the resin is diluted by an organic solvent, such as ethanol or acetone or by water. In some embodiments, excess resin is drained, e.g., by vacuum, or any other method for draining excess liquid, as apparent to the skilled artesian, prior to, during or after partial curing.

Additional materials can be added to the composite, at any stage of the production process. Some non-limiting examples of materials that can be further added to the composite material include nanoparticles, which may be added in order to modify the composite strength its skin shape and appearance. The nanoparticles added to the composite material of the invention may, for example, be $TiO_2$ nanoparticles. The addition of $TiO_2$ nanoparticles is of great importance in achieving, e.g., different optical effects to the composite skin. In some embodiments, silver nanoparticles are added to the composite material of the invention, in order to improve the anti microbial properties of the composite. In other embodiments, nanoclays are added to the composite material to mechanically strengthen the composite and endow the composite with fire resistance properties.

In some additional embodiments, a further cellulose nano-material is added to the composite material, during the composite preparation, as may be necessitated by the targeted application.

Typically, the curing process does not result in the chemical association (formation of chemical bonds) of the polymeric material to the nano-material composing the scaffold. Thus, in some embodiments, there exists no chemical association (no chemical bonds exist) between the cured polymer and the scaffold nano-material. In further embodiments, where some association exists, the association is not covalent bonding.

In some embodiments, the polymer material and the scaffold nano-material are chemically associated by inclusion of at least one linking moiety which is capable of bonding to both materials or by modifying the nano-material and/or the polymeric material to enable chemical association therebetween. Such association may be selected from covalent bonding, ionic interaction, electronic interaction, complexation (coordinative interaction), hydrogen bonding and so forth. In some embodiments, the association is not covalent.

The cellulose nano-material scaffold, which is employed in a process for the production of a composite material according to the invention, may be produced by a variety of ways, as disclosed herein. Once produced, the scaffold may be strengthened by infusion of polymer resin, thereby resulting in a composite material according to the invention, which is characterized by improved mechanical attributes, including high compressive strength and resistance to wet environments.

As used herein, the term "scaffold" is used interchangeably with "foam" or "aerogel" to describe a structure characterized by open cellular structures containing pores that are connected to one another and form an interconnected network. In accordance with the present invention, the scaffold is produced by trapping water in pore domains within the solid cellulose nano-material and subsequently removing the water using a freeze-solvent exchange process.

In some embodiments, the cellulose nano-material foam is prepared by:
1. providing a suspension (slurry) of a cellulose nano-material in an aqueous medium (water or a water comprising solvent/solution);
2. freezing said suspension (to permit the cellulose nano-material to self assemble);
3. treating the frozen suspension under solvent-exchange to substantially afford a solvent-wet, water-free foam; and
4. removing the solvent to afford a substantially solvent and water free cellulose foam.

In some embodiments, the cellulose nano-material is NCC, as defined.

The suspension or slurry is, for some applications, a water suspension, with the nano-material concentration being below about 50% (w/v). In some embodiments, the concentration is below about 25%. In further embodiments, the concentration is below about 10%. In still additional embodiments, the concentration is below about 5%.

In some embodiments, the concentration in the water suspension is at least about 10% (w/v). In further embodiments, the concentration is at most about 10%. In further embodiments, the concentration is between about 10% and about 50%, or between about 10% and 40% or between about 10% and 30%.

In some embodiments, the concentration in the water suspension is at least about 1% (w/v). In further embodiments, the concentration is at most about 10%. In further embodiments, the concentration is between about 1% and about 10%, or between about 1% and 5% or between about 1% and 2.5%. In further embodiments, the concentration is below about 2.5% (w/v).

The freezing step is typically carried out in a mold of a predetermined shape. The mold into which the nano-material suspension is cast may be shaped to any desired architecture. This enables the production of structural parts and core materials of predetermined shapes. Different mold shapes and textures are possible, in accordance with the present invention, enabling the production of parts with various skin textures, such as smooth skin and skin with nano patterning for self cleaning materials. Some non-limiting examples of mold materials are aluminum, silicon, polystyrene and carbon fiber/epoxy composite molds.

Without wishing to be bound by theory, the freezing is achievable at any temperature where cryo-concentration effects occur, where the forming ice crystals push the cellulose nano particles towards each other, forcing local self assembly and arrangement of the NCC into macrostructures which are held together by hydrogen bonds. In some embodiments, the temperature at which freezing occurs is below 0° C. In other embodiments, said temperature is between about −50 C.° (minus 50 C.°) and about −90 C.° (minus 90 C.°). In further embodiments, the temperature is between about −60 C.° (minus 60 C.°) and about −80 C.° (minus 80 C.°) and in further embodiments, the freezing temperature is about −70 C.° (minus 70 C.°).

Next, the frozen foam material is treated to remove substantially all water contained therein. This may be achieved by first treating the foam with a water-soluble solvent, e.g., ethanol, methanol, acetone, iso-propanol, etc., or with an aqueous salt solution (NaCl, NaBr, KCl, KBr, and others), under conditions permitting exchange of water contained within the scaffold cavities with the water-soluble solvent or with the salt. This may be achievable, for example by soaking the foam material in a bath containing the water-soluble solvent or the salt-solution. In order to minimize structural damage to the foam, the solvent or salt-solution is typically cooled to 4° C. or below.

Once water has been replaced by the water-soluble solvent or the salt-solution and has substantially been removed from the pore domains of the cellulose nano-material foam, the water-soluble solvent or salt-solution may be replaced or diluted with a solvent of a lower water-solubility, e.g., hexane, t-butanol, or mixtures thereof with an alcohol, etc., to ensure complete water removal from said domains and afford a solvent-wet (solvent-saturated), substantially water-free foam material. The foam may be dried from the saturating solvent by, e.g., evaporation of the solvent; such evaporation may take place at room temperature or may require vacuum evaporation. The evaporated solvents may be reused.

Following evaporation, solvent and water-free foam is obtained which may be further used as described herein.

As stated above, in order to improve, or alter the mechanical properties of the foam material, the cellulose nano-material used in the preparation of the foam may be crosslinked via one or more linking molecules. The crosslinking may be achievable while in suspension prior to freezing or at any stage prior to the solvent exchange procedure.

The crosslinking may be achieved as described herein. In some embodiments, citric acid is used for crosslinking of the cellulose nano-material (with or without the addition of a catalyst such as $TiO_2$). In other embodiments, 1,2,3,4-butane tetracarboxylic (BCTA) is used for crosslinking of cellulose nano-material.

Similarly, in some embodiments, the linker molecules are selected from starch, polyethyleneimines (PEI), epoxy type materials that form ester or ether bonds in alkaline pH and bi-functional isocyanates/iso-nitrile molecules. In other embodiments, crosslinking involves cellulose-modifying proteins (e.g. materials containing free amines such as Cellulose Binding Domains (CBD).

The foam may be prepared with or without a foaming agent. In some embodiments, the at least one foaming agent is selected from a gaseous material such as carbon dioxide, oxygen, nitrogen, and air or a gas-producing material such as sodium bicarbonate, titanium hydride, and others known in the art.

Alternatively to the above, the composite may be manufactured by directly extruding an aqueous suspension of a cellulose nano-material, and the at least one polymer resin, with or without a foaming agent, under condition permitting cellulose continuity, foam formation and curing. In such embodiments, the conditions may for example involve extruding through a hot spray nozzle at a temperature above 70° C., forming foam and activating the furan resin polymerization.

In another aspect of the present invention, there is provided a cellulose nano-material foam (scaffold, aerogel) having the above-disclosed characteristics. In some embodiments, the foam is obtainable (or obtained) by a process comprising:

1. preparing a suspension (slurry) of cellulose nano-material in an aqueous medium;
2. freezing said suspension (to afford a frozen aqueous cellulose nano-material suspension);
3. treating the frozen suspension under solvent-exchange to substantially afford a solvent saturated, water-free foam, and
4. removing the solvent to afford a substantially solvent and water-free cellulose nano-material foam (characterized by open cellular structures containing pores that are connected to one another and form an interconnected network).

In some embodiments, the cellulose nano-material is NCC, as defined.

The suspension or slurry is, for some applications, a water suspension, with the nano-material concentration being below about 50% (w/v). In some embodiments, the concentration is below about 25%. In further embodiments, the concentration is below about 10%. In still additional embodiments, the concentration is below about 5%.

In some embodiments, the concentration in the water suspension is at least about 10% (w/v). In further embodiments, the concentration is at most about 10%. In further embodiments, the concentration is between about 10% and about 50%, or between about 10% and 40% or between about 10% and 30%.

In some embodiments, the concentration in the water suspension is at least about 1% (w/v). In further embodiments, the concentration is at most about 10%. In further embodiments, the concentration is between about 1% and about 10%, or between about 1% and 5% or between about 1% and 2.5%. In further embodiments, the concentration is below about 2.5% (w/v).

The freezing step is typically carried out in a mold of a predetermined shape. The mold into which the nano-material suspension is cast may be shaped to any desired architecture. This enables the production of structural parts and core materials of predetermined shapes. Different mold shapes and textures are possible, in accordance with the present invention, enabling the production of parts with various skin textures, such as smooth skin and skin with nano patterning for self cleaning materials. Some non-limiting examples of mold materials are aluminum, silicon, polystyrene and carbon fiber/epoxy composite molds.

Without wishing to be bound by theory, the freezing is achievable at any temperature where cryo-concentration effects occur, where the forming ice crystals push the cellulose nano particles towards each other, forcing local self assembly and arrangement of the nano-material into macrostructures which are held together by hydrogen bonds. In some embodiments, the temperature at which freezing occurs is below 0° C. In other embodiments, said temperature is between about −50 C.° (minus 50 C.°) and about −90 C.° (minus 90 C.°). In further embodiments, the temperature is between about −60 C.° (minus 60 C.°) and about −80 C.° (minus 80 C.°) and in further embodiments, the freezing temperature is about −70 C.° (minus 70 C.°).

Next, the frozen foam material is treated to remove substantially all water contained therein. This may be achieved by first treating the foam with a water-soluble solvent, e.g., ethanol, methanol, acetone, iso-propanol, etc., or with an aqueous salt solution, under conditions permitting exchange of water contained within the scaffold cavities with the water-soluble solvent or with the salt. This may be achievable, for example by soaking the foam material in a bath containing the water-soluble solvent or the salt-solution. In order to minimize structural damage to the foam, the solvent or salt-solution is typically cooled to 4° C. or below.

Once water has been replaced by the water-soluble solvent or the salt-solution and has substantially been removed from the pore domains of the cellulose nano-material foam, the water-soluble solvent or salt-solution may be replaced or diluted with a solvent of a lower water-solubility, e.g., hexane, t-butanol, or mixtures thereof with an alcohol, etc., to ensure complete water removal from said domains and afford a solvent-wet (solvent-saturated), substantially water-free foam material. The foam may be dried from the saturating solvent by, e.g., evaporation of the solvent; such evaporation may take place at room temperature or may require vacuum evaporation. The evaporated solvents may be reused.

Following evaporation, solvent and water-free foam is obtained which may be further used as described herein.

In order to improve, or alter the mechanical properties of the foam material, the cellulose nano-material used in the preparation of the foam may be crosslinked via one or more linking molecules. The crosslinking may be achievable while in suspension prior to freezing or at any stage prior to the solvent exchange procedure.

The crosslinking may be achieved as described herein. In some embodiments, citric acid is used for crosslinking of the cellulose nano-material (with or without the addition of a catalyst such as $TiO_2$). In other embodiments, 1,2,3,4-butane tetracarboxylic (BCTA) is used for crosslinking of cellulose nano-material.

Similarly, in some embodiments, the linker molecules are selected from starch, polyethyleneimines (PEI), epoxy type materials that form ester or ether bonds in alkaline pH and bi-functional isocyanates/iso-nitrile molecules. In other embodiments, crosslinking involves cellulose-modifying proteins (e.g. materials containing free amines such as Cellulose Binding Domains (CBD).

The foam may be prepared with or without a foaming agent. In some embodiments, the at least one foaming agent is selected from a gaseous material such as carbon dioxide, oxygen, nitrogen, and air or a gas-producing material such as sodium bicarbonate, titanium hydride, and others known in the art.

The cellulose nano-material foam of the invention (the so-called virgin foam) may serve as a scaffold onto which and/or into which at least one additional component may be introduced to impart additional features to the foam material. In some embodiments, the foam of the invention may be infused with a polymer resin selected amongst natural or synthetic thermoset polymer resins and thermoplastic polymer resins, as defined hereinabove. For some applications, the foam of the invention may be manipulated as disclosed hereinabove for the production of a composite material according to the invention.

The cellulose nano-material foams of the invention may be coated with cellulose nano-material film, by applying a wet cellulose nano-material suspension on the walls of the foam, followed by immediate drying. This affords coating reinforcement of the foam and protects it from external effects such as humidity.

In order to endow foam of the invention with increased mechanical stability, depending on the final intended application, the foam may be laminated with a film of a natural or synthetic material. The lamination may be by one or more lamination films positioned on one or more sides of the foam. For example, where the foam is substantially flat, it may be laminated on both of its faces with one or more lamination materials. Where the foam is constructed as a three dimensional element, e.g., cube, it may be laminated on all of its faces. The lamination film may be of a material selected from natural fabrics, including flax, sisal, wood-fibers hemp, and cotton. Other lamination materials may be selected from mineral wool fiber, glass wool, glass fibers, synthetic fibers such as aramid, paper materials, plastic materials and carbon fibers.

Without being bound thereto, the laminated foams are suitable for use in interior trims (e.g. in cars, boats, planes etc), as fire resistant material and/or flame retarding composites, as insulators for insulation purposes (e.g. when rockwool fiber is used), as shock absorbing materials and others.

In some exemplary embodiments, the invention provides NCC-based foam laminated with flat paper sheets. Generally, such a NCC-based foam laminate, as is the case with any other laminates of the invention, may be constructed by bonding at least two flat sheets of the same or different lamination material, onto an outer surface (face) of foam. The lamination may be carried out in the presence of pressure and/or heat. In some embodiments, the layers or sheets are composed of a homogeneous mixture of two or more materials. In other embodiments, the materials are inhomogeneously distributed in each of the at least two layers or sheets. Thus, for example, a foam material of the invention may be laminated on one of its faces with a paper material and on another of its faces with a natural fabric such as flax.

Thus, the invention provides:

1. Composite articles constructed of a cellulose nano-material scaffold and at least one polymer resin, the cellulose nano-material scaffold having a plurality of open cellular structures containing pores that are connected to one another and form an interconnected network, said pores being at least partially filled with said at least one polymer resin.

2. Composite articles constructed of a cellulose nano-material scaffold and at least one cured polymer, the cellulose nano-material scaffold having a plurality of open cellular structures containing pores that are connected to one another and form an interconnected network, said pores being at least partially filled with said at least one cured polymer.

3. Laminates of composite articles as above.

4. Foam materials of a cellulose nano-material having a plurality of open cellular structures containing pores that are connected to one another and form an interconnected network.

5. Laminates of foam materials as above.

The products of the invention, including foams, composites and laminates, exhibit physical characteristics that improve the structural and mechanical characteristics of articles/devices in which they are part. Thus, the foams and composites of the invention may be used as core materials, acoustic and/or thermal insulation materials, structural supporting elements, protective layers, elements for increasing abrasion resistance, elements for increasing shock or impact resistance, cushioning elements, floating devices, filtering and others.

BRIEF DESCRIPTION OF THE DRAWINGS

In order to understand the invention and to see how it may be carried out in practice, embodiments wherein the at least one cellulose nano-material is CW (NCC) will now be described, by way of non-limiting examples only. As a person versed in the art would realize, MFC or BC may be identically used, alone or in combination with NCC. The embodiments disclosed herein are demonstrated with reference to the accompanying drawings, in which:

FIG. 1A clear liquid crystal suspension of 2.5% NCC in water, and FIG. 1B Transmission Electron Microscopy (TEM) image of the NCC rods with dimensions of 10-20 nm width, 100-300 nm length.

FIG. 2B provides a SEM picture of the foam showing its arrangement in nano-sheets.

FIG. 4A—dried tissue paper production waste; FIG. 4B—NCC suspension produced from the waste, and FIG. 4C—NCC foam produced from paper mill waste.

DETAILED DESCRIPTION OF THE INVENTION

Figure 1A:
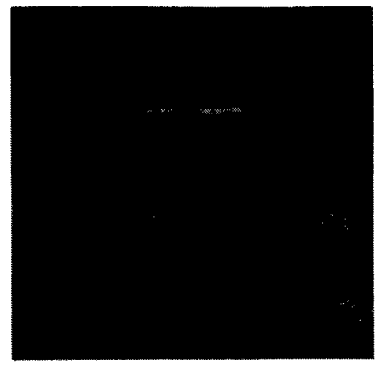
FIGS. 1A-1B demonstrate.
Figure 1B:
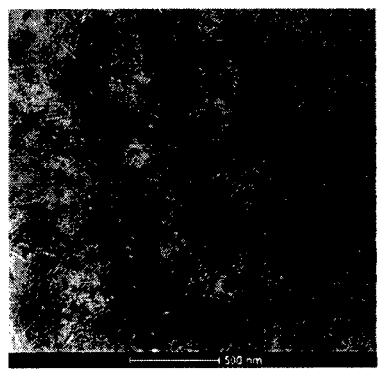

The mechanism for NCC foam formation relays on a self assembly mechanism. Methods for production of NCC from, e.g., MCC, were adopted with some modifications from [8]. The method included controlled $H_2SO_4$ hydrolysis of cellulose fibers (MCC in that example) followed by washing cycles in water and sonication, resulting in optically clear, liquid crystal honey-like suspension of cellulose particles (FIG. 1A). The dimensions of the particles were measured to be 10-20 nm width and 100-200 nm length as viewed by TEM (FIG. 1B).

NCC has been shown to form chiral nematic ordered phases displayed by polarized light birefringence, which is typical to cholesteric liquid crystals in similarity to other biomolecules such as chitin, collagen and DNA [1]. The typical liquid crystal (LC) birefringence is herein demonstrated when the produced NCC was viewed under polarized light microscopy.

The LC suspensions are stable and do not aggregate or flocculate during time. This is explained by grafting of sulfate groups to the cellulose surface during the acid hydrolysis process. Since the particles are charged with sulfate they form electrostatic repulsion which prevents the crystals from reforming hydrogen bonds therefore the suspensions are "forever" stable. Gelling of the suspensions occur when either salts or water soluble solvents that mask the sulfate repulsion are added to the NCC. In some cases gelling occurs when the NCC suspensions are brought to high concentration (usually above 2.5% to 5%). In both cases, the gelling affect was attributed to shifting the balance towards formation of hydrogen bonds between the NCC fibers resulting in solid 3D network formation.

As discussed above NCC tend to self assemble into nematic planes. Moreover, it was shown before that the structure is maintained also when the water is removed [1] which in normal conditions would lead to film formation.

Figure 2A:
FIGS. 2A-2B demonstrate how self-assembled NCC prepared in accordance with the invention (FIG. 2A right foam) differs from a foam not demonstrating self-assembly (FIG. 2A left foam).
Figure 2B:

However, when the suspension is frozen cryo-concentration affect occurs, where the forming ice crystals push the cellulose nano particles towards each other, forcing local self assembly and arrangement of the NCC into nematic macro-structures which are held together by hydrogen bonds (in similarity with the gelling process in liquid suspensions) while the ice prevents them from forming a film. Therefore, a porous 3D network is formed. Moreover, it was discovered that the freezing kinetics was crucial for formation of ordered nematic planes. as shown by the foams strength and Scanning Electron Microscopy (SEM) images (FIGS. 2A and 2B).

Nano-structured cellulose foams have been produced by others using either Micro/Nano Fibrillar Cellulose as well as bacterial cellulose (BC). Some have shown the effect of the cooling process on Micro/nano fibrillar Cellulose (MFC/NFC) foams [9,10] and its effects on foams structure and morphology. In addition, NCC were applied as polyurethane foam reinforcement [11]. As compared with the other cellulosic foams, NCC foams are unique due to the self assembly process of the liquid crystals that is described above.

Direct production of NCC aerogel (foam) by gelling the NCC suspension using acetone (no freezing is involved), followed by supercritical fluid extraction with $CO_2$ resulted in a translucent aerogel. However, this method was not feasible for industrial production for the several reasons. Supercritical fluid extraction is relatively high cost method and the required time of 5 to 7 days for solvent exchange process is extremely long. Moreover, for a production of 150 ml volume of aerogel, about 850 ml of acetone are required, which are replaced twice a day, to a total of 10 liters of acetone for the entire process [12]. Thus, this process is unlikely to meet industrial production demands. The different production method is also expected to result in a more random structure of the aerogel which is expected to be inferior in its mechanical performance. As the developers of the process indicate, the production process results in random orientation of the NCC crystals. Support for this random arrangement also comes from the highly translucence of their aerogels which attests to very thin foam walls.

Example 1

NCC Production from Micro-Crystalline Cellulose

Cellulose nano-whiskers (NCC) suspensions were prepared either by acid hydrolysis or by mechanical disruption of cellulose fibers. The cellulose source which was used varied. In all instances, NCC production followed mutatis mutandis the process described below. It should be understood that while the present example specifically described the NCC production from micro-crystalline cellulose, NCC was similarly obtained from other sources such as pulp and paper mill waste.
1. 10 grams of 200 μm particle size micro crystalline cellulose (MCC, Avicel) were suspended in 200 ml of DDW in a glass flask.
2. The flask was positioned in a iced water bath while stirring.
3. $H_2SO_4$ was gradually added to a final concentration of 47% while keeping the temperature below 40° C.
4. The suspension was transferred to a 60° C. water bath and incubated while shaking for 30 min followed by Centrifugation at 8000 rpm for 10 min.
5. Acid was removed and the pellet was re-suspended in DDW. The washing and re-suspension cycles were repeated for 4 to 5 times until the supernatant coming out of the centrifuge was turbid.
6. Following the final wash the NCC was suspended in around 90 ml DDW (to give around 5% NCC concentration).
7. A sample of the precipitate was weighed before and after drying to determine whiskers concentration.
8. The suspension was brought to 2.5% and followed by sonication by a probe sonicator until the solution became optically clear. The final honey like viscosity of the liquid crystal suspension was achieved after it has been cooled (cooling takes a few hours).

Example 2

Aerogel Production

1. A liquid suspension of NCC at a concentration of around 2.5% or less was cast into a mold.
2. The NCC containing mold was directly lyophilized or alternatively frozen at temperatures of −20° C. to −178° C. (liquid nitrogen) prior to the lyophilization.
3. The NCC was lyophilized for a period of 12 to 24 hrs.
4. The resulting product was a highly porous aerogel which was released from the mold.

Example 3

Production of NCC-Furan Composites

1. Liquid furan resin with 1% sulfonic acid catalyst was applied into the NCC foam until the foam was saturated with the resin.
2. Excess furan was drained (e.g. by vacuum) and the composite foam was cured at a temperature between 70° C. to 150° C. until the furan had completely cured.
3. Optionally, liquid NCC suspension was blended into the furan resin prior to its addition to the NCC foam which allowed a better bonding and interfaces between the composite components.
4. Optionally, sodium bicarbonate was added to the furan to increase the final pore size of the cured aerogel.

Example 4

Production of Cellulose Nano-Material Foam of the Invention

A NCC suspension usually of 2.5% in $H_2O$ was sonicated with a probe sonicator to clarity. Shortly thereafter the suspension was cast into a mold. The suspensions were then transferred into a vacuum chamber for degassing followed by freezing at −70° C. Subsequently, the formed "ice cube" was transferred into a cold water-soluble solvent, such as acetone and ethanol.

The foam was kept in the water-soluble solvent, such as ethanol, until it floated, namely until all of the water was removed and exchanged with ethanol.

The ethanol was then changed with ethanol/hexane 70/30 v/v mixture or ethanol/tert-butanol 70/30 v/v mixture. This process was repeated as may be needed.

The resulting foam was of a high quality, exhibiting good structural maintenance during the drying process.

Figure 3:
FIG. 3 presents a picture of a solvent and water free virgin NCC foam according to the present invention.
Figure 4A:
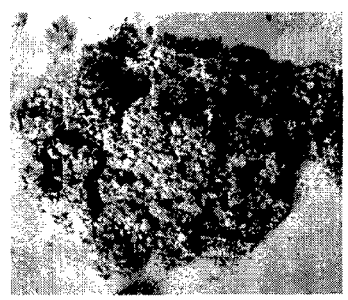
FIGS. 4A-4C demonstrate production of NCC foams using paper mill waste as a source for raw material.
Figure 4B:
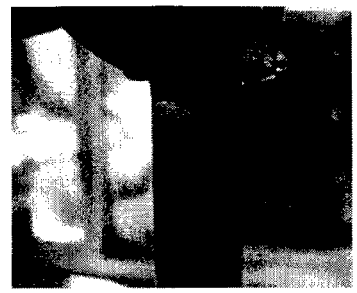
Figure 4C:
Figure 5A:
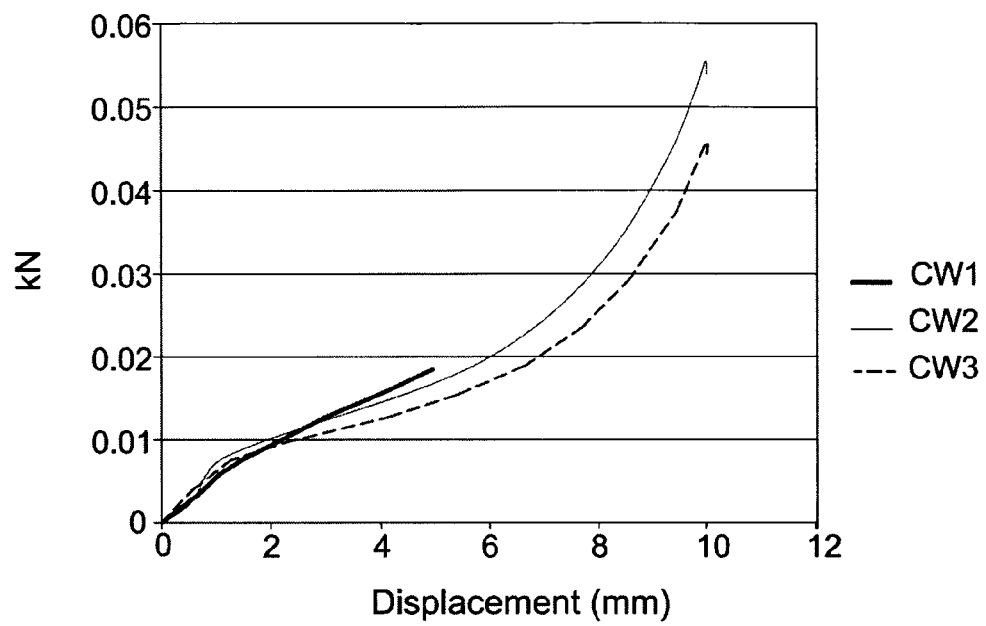
FIGS. 5A-5C depict compression tests curves of NCC virgin foam (FIG. 5A), NCC reinforced with 50% furan resin (FIG. 5B) diluted in ethanol, and NCC reinforced with 85% (non-diluted) furan resin (FIG. 5C).
Figure 5B:
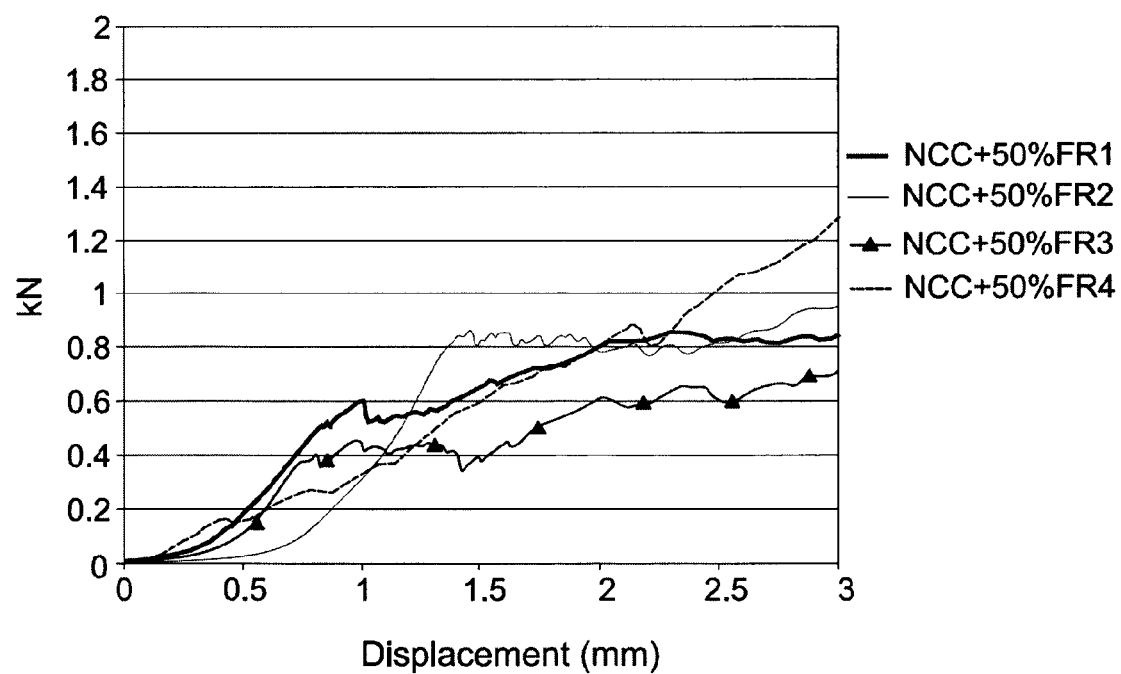
Figure 5C:
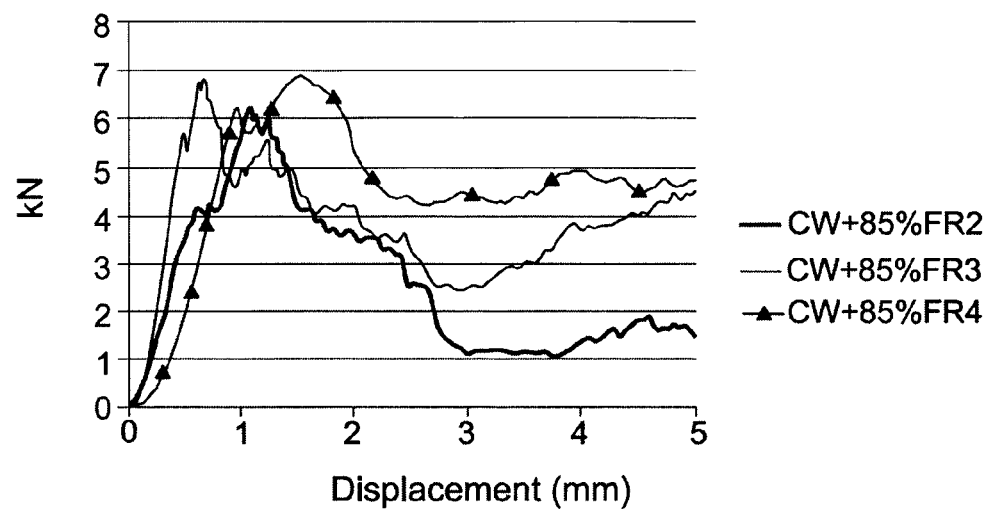
Figure 6:
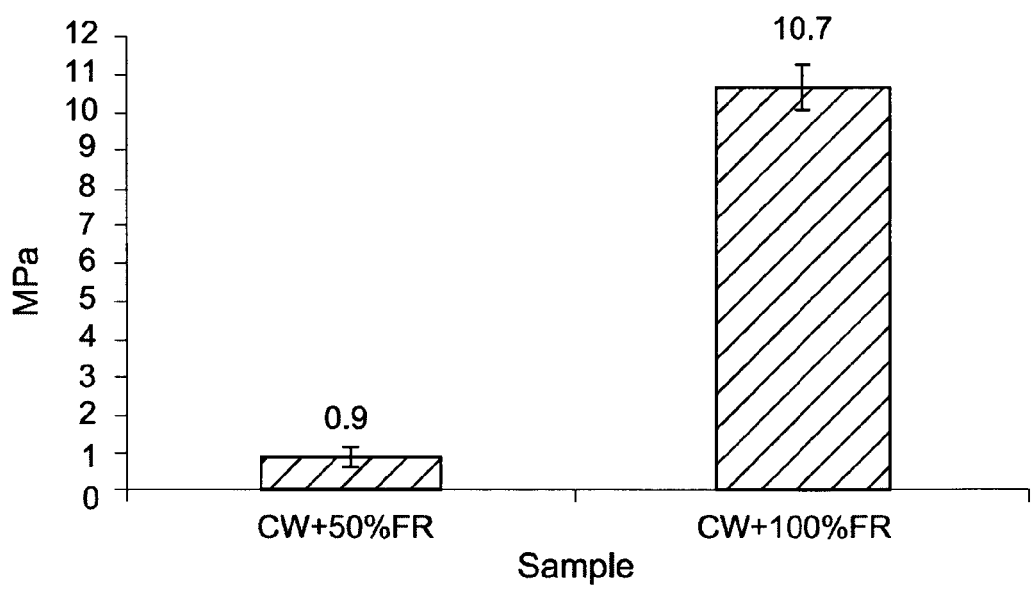
FIG. 6 presents a summary of the compression test results of composite NCC/furan foams reinforced with 50% and 85% furan resin.

Finally, the solvent saturated foam was transferred either to vacuum or to a chemical evaporator or to a drying oven. The solvents were evaporated, forming a dry nano structured aerogel (FIG. 3).

Molds made of different types of materials e.g. aluminum, silicon, polystyrene and carbon fiber/epoxy composite molds have been used. In all cases freezing at a temperature around −70° C. led to the required results.

As stated above, NCC was produced from several raw material sources such as Micro Crystalline Cellulose (Avicel® PH), softwood bleached pulp, and hardwood bleached pulp as well as from paper mill sludge (FIGS.

4A-C). In all cases, successful conversion of NCC suspensions into foam was successful employing the same process of the invention.

Example 5

Foam Reinforcement

NCC foams that have been so produced were aerogels with density of 25 kg/m³. Though they are extremely light weight, they are soft, and may be easily disintegrated. They additionally exhibit low tensile strengths particularly in wet environments. The foams are strengthened by infusion of polymer resin resulting in high compressive strength and resistance to wet environment.

The exemplary resin that was used was a biobased thermoset furan resin produced from sugar cane baggase. BioRez™, a two component resin produced by Transfuran Chemicals bvba, Geel, Belgium was also employed.

The commercially available furan resin at a concentration of 85% was either directly used or diluted in water to a concentration between 65%40%. 1% sulfonic acid was used as a catalyst.

The resin was infused within the foam followed by vacuum in order to evenly distribute it in the foam and to remove access resin. The foam was cured at 80° C. for 2 to 12 hrs. The resulting foams were very stiff with compressive strength up to 10 MPa and compressive modulus up to 250 MPa. The density of the foams was 350 to 500 kg/m3 (FIGS. 5A-C and 6).

An added value to the foams', e.g., NCC/furan foams, mechanical strength was their fire resistance properties. When inserted into a Bunsen flame the composite foams self extinguish when they were removed from the flame and do not burn. Standard polymeric foams are highly flammable and emit toxic gases while burning. Flame resistant foams do exist; they are mainly produced from phenolic foams which that are highly expensive or by adding fire retarding agents (e.g. bromide material) to standard polymeric foams.

The composite NCC/furan foam has a potential as lower cost flame resistant foam which will enable it to be used in applications that are currently banned from standard foams due to the reasons above such as in the shipping market.

Since the virgin NCC foam serves as a scaffold it can be infused with any other natural or synthetic thermoset/thermoplastic resins. We have successfully infused other resins such as standard polyester, epoxy, and natural rubber. Polyester and epoxy resulted in stiff foams while the natural rubber resulted in flexible foam with high elasticity.

These examples demonstrate how the NCC foam system is a platform for production of many potential products.

Example 6

Crosslinking

If the cellulose fibers are crosslinked the technical properties of the virgin NCC foam improve in such a way that it requires little if any polymer resin to achieve its required strength without impairing the density. Since the NCC has numerous OH groups on the surface they can be crosslinked via ester bonds and even more preferably ether bonds formation.

The crosslinkers that were chosen are such that have been used in the textile industry as ureaformaldehyde replacement and from the food and drug industries.

Citric acid has 3 carboxylic groups with or without the addition of $TiO_2$ as catalyst was tested. 2.25% NCC suspension with 0.1M citric acid with or without 0.06% of $TiO_2$ were mixed together. The suspension was then heated to 80° C. for 60 minutes resulting in increase in the viscosity of the suspension indicating for crosslinking of the cellulose fibers. Addition of $TiO_2$ seemed to further increase the viscosity. When salt are added to NCC suspensions gels formed. Citric acid did not cause gel formation and the suspension became viscous as results of the heat treatment. The reaction took place also at room temperature in a slower rate.

Foams were produced from these suspension displayed higher shear strength tested by compression of the foam into a sheet and manual puling of both ends. Non-crosslinked foams were easily ruptured while the crosslinked foams were very hard to rupture.

Another carboxylic acid was 1,2,3,4-butane tetracarboxylic (BCTA) which contain 5 carboxylic groups. The catalyst used with BCTA is Sodium hypophosphite, $NaPO_2H_2$.

Example 7

Paper Composites

Figure 7:
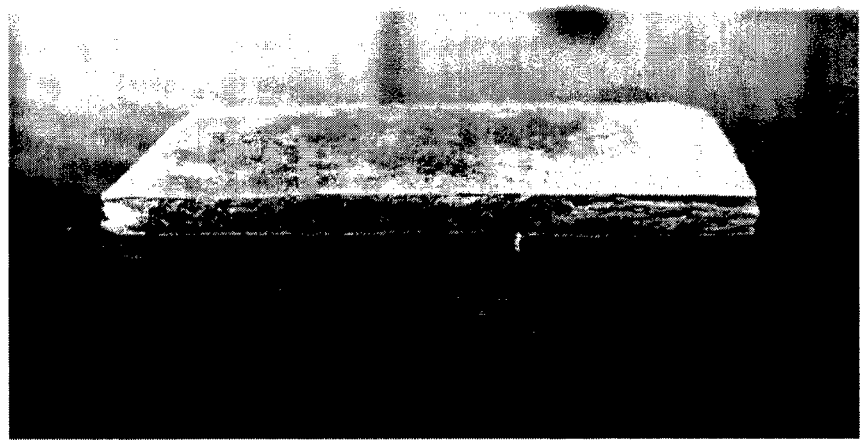
FIG. 7 presents a Ligno-cellulosic composite panel. NCC foam laminated with linerboard used for corrugated paper production.

Composite panels of NCC foam laminated with linerboard paper were produced. The linerboard paper was glued to the NCC with regular "students" paper glue, compressed and cured at 60° C. over night. The resulting composite displayed high strength and could be suitable for packaging as well as construction applications (FIG. 7).

The invention claimed is:

1. A composite article, comprising:
    a scaffold arranged in substantially ordered nano-sheets and having a plurality of pores, the scaffold comprising at least one cellulose nano-material selected from the group consisting of nanocrystalline cellulose (NCC) and microfibrillar cellulose (MFC); and
    at least one polymer resin at least partially occupying a plurality of pores in the scaffold.

2. The article according to claim 1, wherein the at least one cellulose nano-material is NCC.

3. The article according to claim 2, wherein the NCC is between about 100 nm and 400 nm in length and between about 5 nm and 30 nm in thickness.

4. The article according to claim 1, wherein at least two types of cellulose nano-material are present in the scaffold.

5. The article according to claim 1, wherein the polymer resin comprises at least one thermoset polymer and/or at least one thermoplastic polymer.

6. The article according to claim 5, wherein the polymer resin comprises at least one thermoset polymer resin selected from the group consisting of a thermoset silicone polymer, a thermoset organic polymer, a polyolefin, a polar thermoplastic, polystyrene, polyvinyl chloride (PVC), acrylonitrile-butadiene-styrene (ABS), a styrene copolymer, polyacrylonitrile, a polyacrylate, a polyacrylamide, a vinyl acetate polymer, a vinyl alcohol polymer, a cellulose plastic, a thermoplastic elastomer, a thermoplastic polyurethane, a polyester-based thermoplastic elastomer, a thermoplastic polyester, polyethylene terephthalate, polybutylene terephthalate, a compatibilized thermoplastic blend, polyacetal, a polyether, a polyarylate, a polycarbonate, a polyamide, polyimides, a polybenzimidazole, an aromatic polyhydrazide, an aromatic polyoxadiazole, polyphenyl-a quinoxaline, polyphenylene sulfide, polyphenylene vinylene, a conducting thermoplastic, a conducting thermoplastics composite, a poly(aryl ether sulfone), a poly(aryl ether ketone), a poly(aryl ether ketones-cosulfones), a poly(aryl ether ketone amide) and polytetrafluoroethylene, and mixtures thereof.

7. The article according to claim 6, wherein the thermoset silicone polymer is selected from the group consisting of a silicone gel and a silicone resin, and mixtures thereof, and/or the thermoset organic polymer is selected from the group consisting of an epoxy resin, an amino resin, a polyurethane, a polyimide, a phenolic resin, a cyanate ester resin, a bismaleimide resin, a polyester and an acrylic resin, and mixtures thereof.

8. The article according to claim 5, wherein the at least one thermoset resin is a furan resin, optionally selected from the group consisting of liquid furfuryl alcohol resin, furfuryl alcohol-formaldehyde resin, furfuryl alcohol-furfural-formaldehyde resin, furfuryl alcohol phenol resin, furfuryl alcohol-urea-formaldehyde resin, furfuryl alcohol-urea-phenol resin and furfural phenol resin.

9. The article according to claim 8, wherein the furan resin is furfuryl alcohol resin.

10. The article according to claim 1, wherein the cellulose: polymer weight ratio in the article is between about 1:100 to 100:1.

11. The article according to claim 1, in laminated form.

12. The article according to claim 1, manufactured by a process comprising:
    (a) obtaining a cellulose nano-material scaffold;
    (b) infusing a liquid resin of at least one polymer to the scaffold;
    (c) curing the product of step (b) to obtain partial or complete curing of the resin in the scaffold.

13. The article according to claim 12, wherein the scaffold is prepared by:
    (a) providing a suspension of a cellulose nano-material in an aqueous medium;
    (b) freezing said suspension;
    (c) treating the frozen suspension under solvent-exchange to afford a solvent-wet, substantially water-free scaffold; and
    (d) removing the solvent to afford a substantially solvent and water-free cellulose scaffold.

14. The article according to claim 13, wherein the cellulose nano-material is NCC.

15. The article according to claim 1, wherein the cellulose nano-material is NCC and the at least one polymer resin is furfuryl alcohol resin.

16. A cellulose nano-material foam arranged in substantially ordered nano-sheets obtainable by a process comprising:
    (a) obtaining a suspension of cellulose nano-material in an aqueous medium;
    (b) freezing said suspension to afford a frozen aqueous cellulose nano-material suspension;
    (c) treating the frozen suspension under solvent-exchange to afford a solvent saturated, substantially water-free foam; and
    (d) removing the solvent to afford a substantially solvent and water-free cellulose nano-material foam.

17. The foam according to claim 16, wherein the cellulose nano-material is NCC.

18. The foam according to claim 16, wherein the solvent exchange comprises treating the foam with a water-soluble solvent or with an aqueous salt solution and repeating the treatment until water contained in said foam is substantially removed.

19. The foam according to claim 16, wherein said foam being for use as a scaffold, said foam being infused with a polymer resin, said foam being coated with cellulose nano-material film, or said foam being laminated with a film of a natural or synthetic material.

20. A composite article, comprising:
    a scaffold arranged in substantially ordered nano-sheets and having a plurality of open cellular structures comprising pores that are connected to one another and form an interconnected network, the scaffold comprising NCC; and
    at least one polymer resin,
    the pores being at least partially filled with the at least one polymer resin, and optionally, the polymer resin being cured.

21. The composite according to claim 20, wherein the nano-material is NCC and said polymer resin is furfuryl alcohol resin.

* * * * *